Patented July 6, 1954

2,683,092

UNITED STATES PATENT OFFICE 2,683,092

MODIFIED SUGAR CANE WAX AND METHOD OF PREPARATION

Donald E. Whyte and Edward A. Wilder, Racine, Wis., assignors to S. C. Johnson & Son, Inc., Racine, Wis.

No Drawing. Application May 15, 1952, Serial No. 288,014

7 Claims. (Cl. 106—231)

This invention relates to a method of treating refined sugar cane wax and the product resulting therefrom. More particularly, the invention relates to a method of substantially improving the oil-retention and gel-formation properties of refined sugar cane wax and the new and improved wax product produced by such method.

Crude cane wax consists essentially of three components; a hard wax fraction, a soft or fatty fraction and a resinous fraction. Commercial uses for the hard wax fraction have been appreciated, but its prior separation from the soft fatty fraction is requisite. This is known as "defatting." After the soft fraction has been eliminated, it has been found additionally expedient, for most intended uses, that the dark pitch-like resinous material be extracted from the hard wax fraction and such methods are referred to as "deresination processes".

Whereas the wax on the surface of the cane is hard and pale in color, upon being extracted from the cachaza and defatted, the resulting hard fraction wax is brown-black in color. Even after deresination, it is dark green-brown. The hard fraction wax, having been in contact with all the constituents of the plant and the products of bacterial and mold attack retains a pungent and moldy odor. Then too, in this condition, the wax cannot be used conventionally as, for example, in a polish, since it has substantially little oil-retention and gel-forming power, but after admixture with a hot solvent, precipitates upon subsequent cooling and much of the solvent separates as a clear supernatant liquid.

In order to overcome the above-described limitations, treatment or purification of the wax through the use of conventional organic bleach materials has been investigated. Where the wax so treated was not first properly deresinated, the black resin impairs color change. In addition, the resultant product has little or no gel-forming potency. Even in the case where the wax has been first deresinated, we have found that treatment with conventionally-advocated chemical bleaches causes a change in color to a reddish hue. Furthermore, these bleaches have demonstrated a deteriorating effect on the wax, reducing the molecular structure so that the waxes are soft and tacky and should they be incorporated in a conventional type wax polish composition, upon buffing the applied film, substantial smear and tackiness is evident upon the treated surface.

In an effort to eliminate the undesirable color and odor of the hard fraction wax and derive a modified wax having strong gel-formation and oil-retention properties, we have discovered a method of treating refined sugar cane wax having a soluble content of at least 97% by weight in boiling isopropanol, which comprises mixing the wax with from 3 to 20% by weight of a material selected from the group consisting of rosin acids, rosin adducts, rosin esters and mixtures thereof. The wax and rosin material are then melted and the molten mixture is maintained at a temperature of from 80° C. to 155° C., while oxygen-containing gas is introduced and dispersed into the mixture. This is continued until the acid number of the mixture has increased to at least 25, but not more than 38. Agitation is simultaneously conducted while the oxygen-containing gas is contacted with the mixture.

We have also discovered, as a result of employment of the above process, a modified cane wax being pale-beige in color, substantially odorless and comprising from 80 to 97% by weight of sugar cane wax, which is at least 97% soluble in boiling isopropanol, and from 3 to about 20% by weight of a material selected from the group consisting of rosin acids, rosin adducts, rosin esters and mixtures thereof. The modified wax has an acid number of from 25 to 38, an oil retention penetration value of less than 45 and strong gel-forming characteristics.

Now, having indicated in a general way the nature and purpose of this invention, the following examples will illustrate the invention. It is to be understood, however, that such examples are presented merely as illustrations of the invention and are not construed as limiting the same.

Example 1

5 pounds of N-wood rosin was admixed with 95 pounds of hard fraction sugar cane wax which had been deresinated to the extent that it was at least 97% soluble in boiling isopropanol and had the following characteristics:

1. Color _____ Dark green brown.
2. Odor _____ Pungent, moldy.
3. Acid no _____ 9.
4. Oil retention value _____ 59.
5. Gel strength _____ 10% by weight of the wax and 10% carnauba wax blended with 80% hot naphtha, cooled, resulted in a mixture which was a fluid slurry.

The 100 pound mixture was melted in a suitable vessel and was maintained at a temperature of approximately 110° C. While the molten mixture was maintained at that elevated temperature, air was introduced through the bottom of the vessel by means of a gas dispersion tube at a rate of approximately 950 cubic feet per hour. Simultaneous with the entrance of air into the vessel, mechanical agitation was conducted immediately above the air entrance. The exothermic reaction was conducted until the mixture attained an acid number of 30, thereupon it was cooled and bore the following characteristics:

1. Color _____ Pale tan yellow.
2. Odor _____ Substantially deodorized.
3. Acid no _____ 30.
4. Oil retention value 30.
5. Gel strength _____ A paste wax composition comprising 10% by weight of the treated cane wax-rosin mixture. 10% carnauba wax and 80% naphtha was produced. The paste had a cone penetrometer value of 101.

*Example 2*

100 pounds of hard fraction sugar cane wax, which had been deresinated to the extent that it was at least 97% soluble by weight in boiling isopropanol and identical to the sugar cane wax used in Example 1, was treated exactly as the wax-rosin mixture in Example 1. The resultant treated wax was pale tan-yellow, substantially deodorized, had an oil retention penetration value of 45 and, when used in a paste wax composition with 10% carnauba and 80% naphtha, produced a paste which had a cone penetrometer value of 192.4.

In comparing the materials resulting from the processes set forth in Examples 1 and 2, it will be noted that in either case the products are definitely improved in color over the starting material, and the undesirable odor is substantially eliminated. However, the product of Example 1, wherein the process of this invention is set forth, bears two substantial improvements over the product of Example 2. These reside in the oil-retention and gel-formation qualities.

In order to achieve these two definite improvements, we have found it necessary that from 3 to 20% of a material selected from the group consisting of rosin acids, rosin adducts, rosin ester and mixtures thereof, by weight of the final product must be included. This will be appreciated since the product of Example 2 did not include any of the specified rosin derivatives. The rosin material must be processed in combination with the sugar cane wax. Addition of the rosin material, subsequent to the processing of the wax, not only renders no beneficial effects, but in some respects promotes undesirable characteristics. Although N-wood rosin (80 to 90% abietic acid) was shown in Example 1, we have appreciated that other rosin acids, such as levopimaric acid, neoabietic acid and d-pimaric acid; rosin adducts, typical of which are rosin maleic (it is recognized that if fumaric acid is used for adduct formation, that it converts to maleic in order to form the adduct), maleopimaric acid; and rosin esters, such as glycerol ester of maleopimaric acid, pentaerythritol ester of rosin maleic adduct, glyceryl rosinate, glycol rosinate and pentaerythritol rosinate, may be substituted, either singly or in combination, for the rosin material shown in the example. However, the quantity of rosin material employed is highly critical. Where less than 3% is incorporated with the wax and subsequently oxidized therewith, the resultant product does not bear appreciable improvement. On the other hand, should more than 20% by weight of any of the specified rosin materials be incorporated, the resultant treated product bears strong indications of resin, rather than wax-like, characteristics; that is, it is too brittle and tends to be tacky.

In order to attain a wax-rosin material product which is definitely improved in oil-retention and gel-formation properties, it is necessary that the sugar cane wax be exclusively hard fraction and deresinated to the extent that it does not contain more than 3% by weight of resin or, conversely, that the wax be at least 97% soluble in boiling isopropanol. Should any of the specified rosin materials be admixed with a sugar cane wax having less than the above solubility characteristics, substantial deficiencies in oil penetration value and gel strength of the resultant treated material will be noted.

Where sugar cane wax, which is at least 97% soluble in boiling isopropanol, is treated in the prescribed manner, but not processed in conjunction with the rosin material, definite improvements are noted (see Example 2), but the resultant treated wax is deficient in the two highly demanding characteristics; gel strength and oil retention. It is only when the prescribed amount of the rosin derivative is included that the resultant modified wax is satisfactory in these two respects.

Sugar cane wax has recently received consideration for use in the carbon paper industry. However, it has been the experience of investigators in this field that the ordinary type of this wax does not qualify in respect to oil-retention penetration. If the wax is incapable of substantial oil retention, it is greasy and smeary, causing easy and unintentional removal of the ink-composition from the carbon paper. It is therefore desirable that a modified wax product of this variety have an oil-retention penetration value of not more than 45. These determinations were conducted by melting at 100° C., 25 grams of the modified wax product on test and 25 grams of ink oil. The mixture was stirred to uniformity and poured into an aluminum foil dish approximately 2½ inches in diameter and ½ inch deep, filling it completely. After the mixture had solidified, it was conditioned at 250° C. for two hours or more. The depth of penetration into the mixture, with a needle having a 9° angle point, carrying a weight to provide a total of 100 grams was then determined. The oil retention penetration value is represented as the penetration in $\frac{1}{10}$ millimeters. The apparatus used was that described in American Society for Testing Materials Designation 217. It will be noted that the wax-rosin product treated in Example 1 bore a substantially smaller penetrometer reading than that of the starting material or of the resultant material of Example 2 and, therefore, is recognized as being substantially greater in oil-retention capacity.

It should be observed, in the prescribed process, that the oxidation reaction be conducted until the acid number is increased to at least 25, but not more than 38. This observation of the acid number is a gauge or criterion by which the processor is able to appreciate at what stage the physical characteristics of the wax-rosin material mixture have been sufficiently altered. If the action is stopped before the acid number is increased to 25, the improvements sought are not appreciable. If the process is allowed to continue until the acid number is extended above 38, the improvements in the resultant product decline, as far as gel-formation properties are concerned. It is believed that this is due to the fact that certain portions of the rosin material become hydroxylated, free acids are formed and esterification of the hydroxylated rosin (products considered to exert a beneficial effect on gel formation) occurs.

It is preferred that agitation of the molten wax be conducted while the oxygen-containing gas is being admitted to the vessel. The fine bubbles of gas, upon entrance into the vessel, have the tendency to coalesce too rapidly to present an effective contact area. When the agitation is conducted adjacently above the gas entrance, it promotes a shearing action and redistributes ascending gas, not only maintaining a minute bubble size, but also, by folding action, delaying the escape of the air from the surface of the molten wax-rosin material mixture.

The reaction may be conducted within a fairly wide temperature range, from 80° C. (the hard fraction wax has a melting point of about 79° C.) to approximately 155° C. This upper limit must be observed since, at this temperature, pyrolytic effects develop a red coloration in the wax-rosin material mixture, definitely affecting its ultimate color change and the gel-formation properties.

It will be noted in the examples that oxygen-containing gas was introduced into the molten material at a rate of approximately 950 cubic feet per hour, or approximately 10 cubic feet per hour per pound of material. It should be appreciated that this flow rate may be widely varied, depending upon several factors; as for example, the size and shape of the vessel, type of agitation employed, and the amount of time to be allowed the reaction.

Thus, through the practice of our prescribed process, as stated in the claims hereafter following, a new and improved wax-rosin derivative material is produced which bears functional and physical improvements over the unprocessed wax or the processed wax, wherein the critical amount of any of the specified rosin materials is not incorporated.

Other modes of applying the principle in the invention may be employed instead of those explained, change being made as regards the process herein described and/or its new and improved wax product, providing the step or steps stated or the new and improved wax product described in any of the following claims or the equivalent of such stated step or steps or product be employed.

We claim:

1. A method of treating refined sugar cane wax having a soluble content of at least 97% by weight in boiling isopropanol, which comprises mixing said wax with from 3 to 20% by weight of a material selected from the group consisting of rosin acids, rosin-maleic anhydride addition products, rosin esters and mixtures thereof, melting said wax and said material and maintaining the molten mixture at a temperature of from 80° to 155° C., while introducing and dispersing oxygen-containing gas into said mixture until the acid number has increased to at least 25, but not more than 38.

2. A method of treating refined sugar cane wax having a soluble content of at least 97% by weight in boiling isopropanol, which comprises mixing said wax with from 3 to 20% by weight of a material selected from the group consisting of rosin acids, rosin-maleic anhydride addition products, rosin esters and mixtures thereof, melting said wax and said material and maintaining the molten mixture at a temperature of from 80° to 155° C., while introducing and mechanically agitating oxygen-containing gas into said mixture until the acid number has increased to at least 25, but not more than 38.

3. A modified sugar cane wax being a pale-beige in color, substantially odorless, and consisting essentially of from 80 to 97% by weight of cane wax, which is at least 97% soluble in boiling isopropanol, and from 3 to about 20% by weight of a material selected from the group consisting of rosin acids, rosin-maleic anhydride addition products, rosin esters and mixtures thereof, said modified wax having an oil retention penetration value of less than 45 and strong gel-forming characteristics.

4. A modified sugar cane wax being a pale-beige in color, substantially odorless, and consisting essentially of from 80 to 97% by weight of cane wax, which is at least 97% soluble in boiling isopropanol, and from 3 to about 20% by weight of a rosin acid, said modified wax having an oil retention penetration value of less than 45 and strong gel-forming characteristics.

5. A modified sugar cane wax being a pale-beige in color, substantially odorless, and consisting essentially of from 80 to 97% by weight of cane wax, which is at least 97% soluble in boiling isopropanol, and from 3 to about 20% by weight of a rosin-maleic anhydride addition product, said modified wax having an oil retention penetration value of less than 45 and strong gel-forming characteristics.

6. A modified sugar cane wax being a pale-beige in color, substantially odorless, and consisting essentially of from 80 to 97% by weight of cane wax, which is at least 97% soluble in boiling isopropanol, and from 3 to about 20% by weight of a rosin ester, said modified wax having an oil retention penetration value of less than 45 and strong gel-forming characteristics.

7. A modified sugar cane wax being a pale-beige in color, substantially odorless, and consisting essentially of from 80 to 97% by weight of cane wax, which is at least 97% soluble in boiling isopropanol, and from 3 to about 20% by weight of an N-wood rosin, said modified wax having an oil retention penetration value of less than 45 and strong gel-forming characteristics.

References Cited in the file of this patent

UNITED STATES PATENTS

| Number | Name | Date |
|---|---|---|
| 2,261,091 | Maguire | Oct. 28, 1941 |
| 2,371,473 | Sanford | Mar. 13, 1945 |

OTHER REFERENCES

Wax and Fatty Byproducts from Sugar Cane, R. T. Balch, Technological Report Series No. 3, Sugar Research Foundation Inc., N. Y., 1947, page 37.